(No Model.) 2 Sheets—Sheet 1.
G. W. DITHRIDGE.
BEAM OR SILL.
No. 426,560. Patented Apr. 29, 1890.
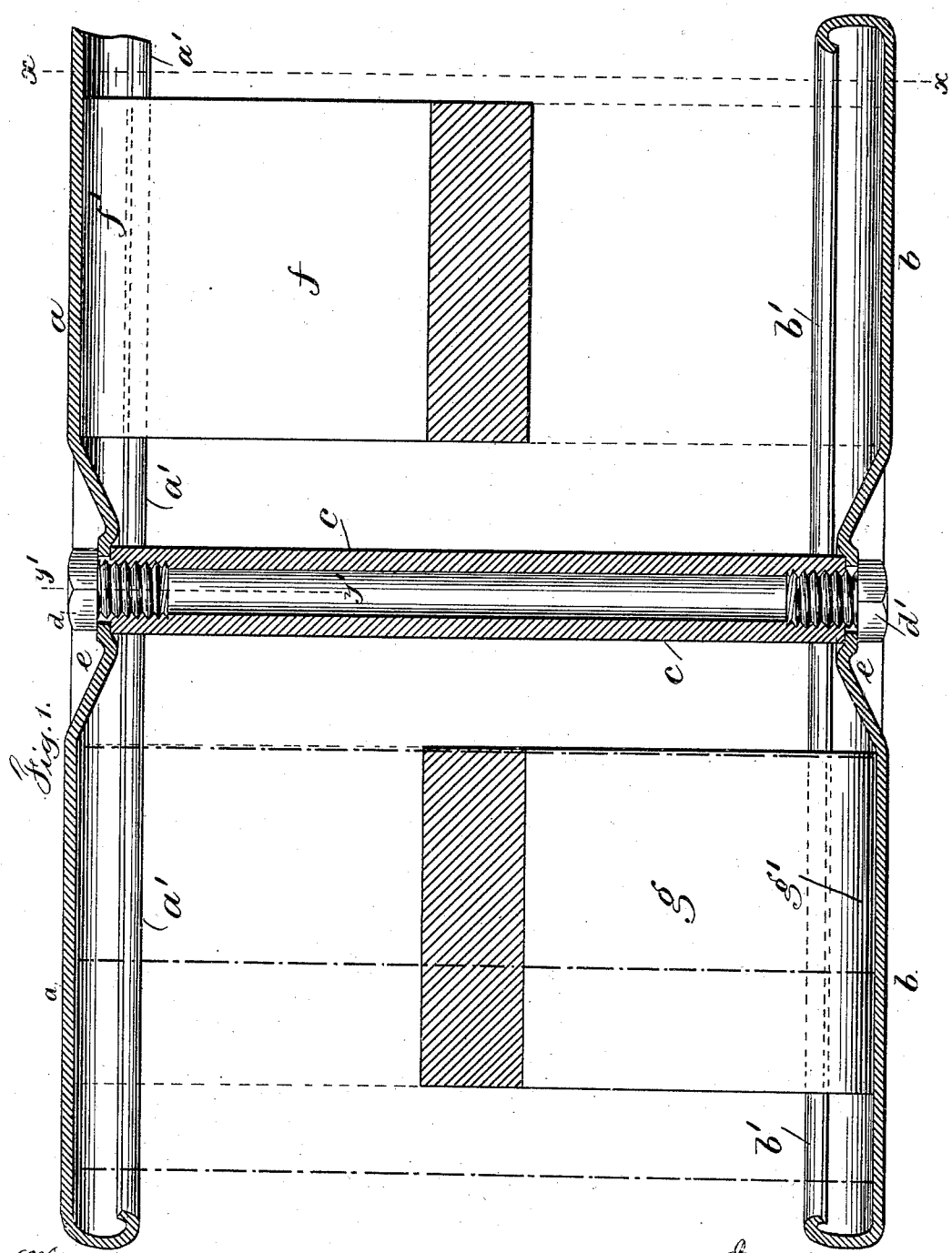
Witnesses
Chas. H. Smith
J. Staib
Inventor
George W. Dithridge
by Lemuel W. Serrell
atty (No Model.) 2 Sheets—Sheet 2.
G. W. DITHRIDGE.
BEAM OR SILL.
No. 426,560. Patented Apr. 29, 1890.
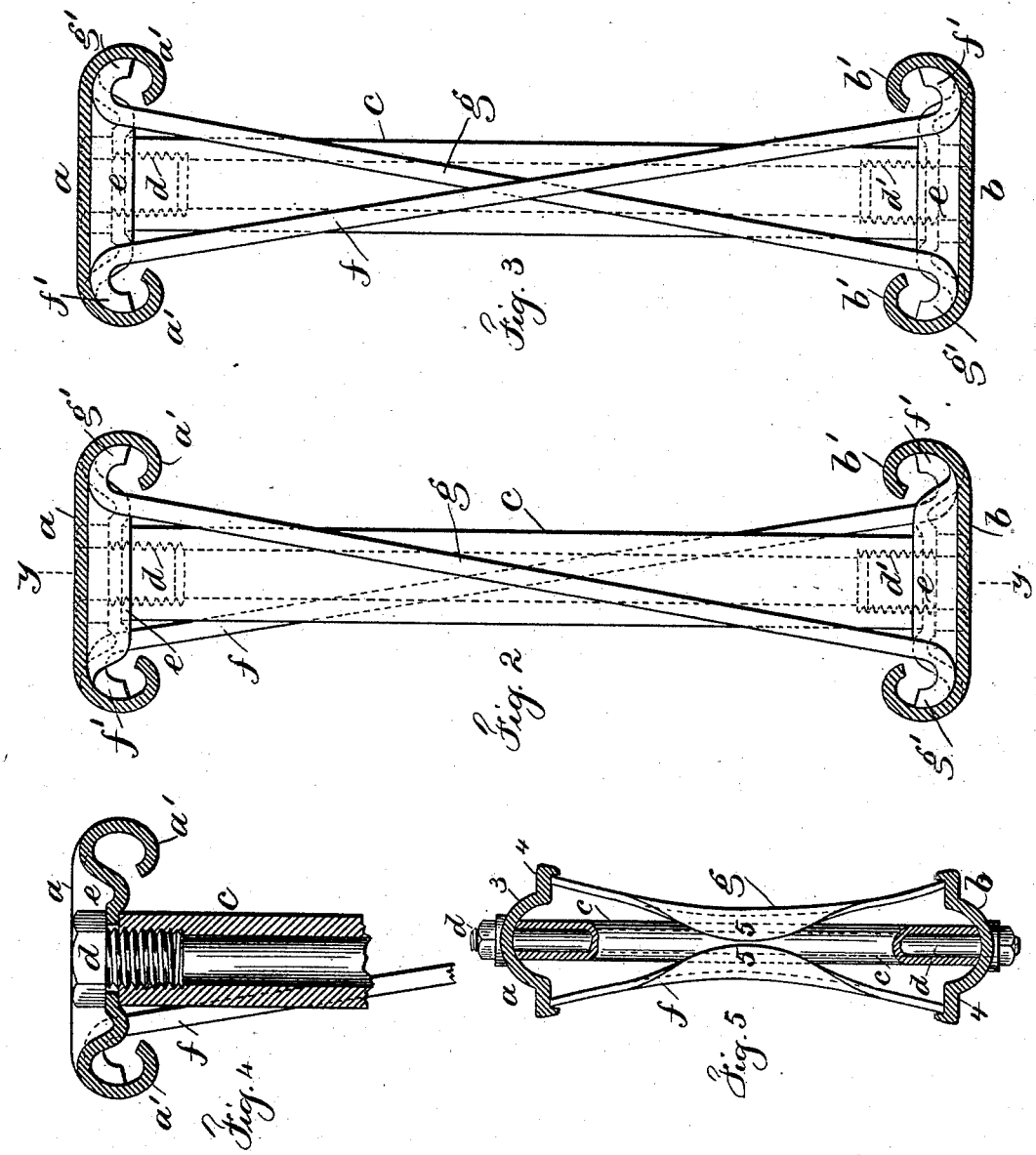
Witnesses
Chas. H. Smith
J. Staib
Inventor
George W. Dithridge
per Lemuel W. Serrell
atty.

UNITED STATES PATENT OFFICE.

GEORGE W. DITHRIDGE, OF NEW YORK, N. Y.

BEAM OR SILL.

SPECIFICATION forming part of Letters Patent No. 426,560, dated April 29, 1890.

Application filed August 28, 1889. Serial No. 322,179. (No model.)

*To all whom it may concern:*

Be it known that I, GEORGE W. DITHRIDGE, of the city, county, and State of New York, have invented a new and useful Improvement in Beams or Sills, of which the following is a specification.

My invention relates to metal beams or sills for buildings, elevated-railroad structures, railroad-cars, and other purposes; and the same consists in a beam or sill having upper and lower or edge members with flanged or beaded edges, the said members being at intervals connected together by tubes and bolts, and being braced and stayed by inclined interlocking plates.

In the drawings, Figure 1 is a longitudinal section of my improved beam or sill at the line $y\,y$, Fig. 2. Fig. 2 is a cross-sectional view at the line $x\,x$ of Fig. 1, and Fig. 3 is a similar cross-section of a modification of the beam. Fig. 4 is a partial cross-section at $y'\,y'$ of Fig. 1, and Fig. 5 is a cross-section of a beam or sill of similar but modified form.

$a$ represents the upper and $b$ the lower members of my improved beam or sill, and the same have flanged or beaded edges $a'\,b'$, and these members are to be made of any desired length, width, and thickness, and I prefer to make the same of Bessimer steel, and to roll the same to shape from a plate or band. These upper and lower members $a\,b$ with similar faces are connected together at intervals by connecting-tubes $c$ and bolts $d\,d'$, which pass through the members and into the tubes, and I remark that I prefer to depress the middle portions of the members $a\,b$ at $e$, Fig. 1, at the places where they are connected by the tubes $c$ and bolts $d\,d'$, the object of which is to recess the bolt-heads, so that they will not interfere or be in the way of flooring, masonry, &c., with which the beam or sill may come in contact.

The braces or stays $f\,g$ are plates of steel with beaded or flanged ends $f'\,g'$, which rest within the beaded or flanged edges $a'\,b'$ of the upper and lower members. The edges $f'\,g'$ of the plates $f\,g$ are beaded in opposite directions, and said plates are set between said members at an inclination from one side of the lower member to the opposite side of the upper member.

The bolts $d\,d'$ draw the members $a\,b$ together, and clamp and confine the plates $f\,g$ in forming the beam or sill. One plate $f$, inclined in one direction, is placed at one side of the tube $c$, and another plate $g$, inclined in the opposite direction, is placed at the other side of the tube $c$, as shown in full lines, Figs. 1 and 2.

I sometimes employ two plates $f\,g$, set in opposite directions at each side of the tube $c$, as shown in full lines, Fig. 3, and in dotted lines at the left-hand side of Fig. 1, in which case greater uniformity of strength and stiffness is imparted to the beam or sill.

The modified construction shown in Fig. 5 consists in making the upper and lower members $a\,b$ with convex faces 3, having flanged edges 4, the tube $c$ extending into the concave sides of the convex faces 3, and the bolt $d$ passes through the tube $c$ and is provided with end nuts or heads outside the convex faces. In this case the plates $f\,g$ between the flanged edges 4 of the upper and lower members are placed vertically, and are concaved toward the tube $c$, and their central portions 5 curved or convexed across the face of the plate at right angles to their concaved length. This is done to impart strength and stiffness to the plates.

My improved beam or sill is easily and quickly put together, and is economically constructed from heavy metal, and is rigid and strong and desirable.

I claim as my invention—

1. The combination, in a beam or sill, of the upper and lower members $a\,b$, having flanged or beaded edges $a'\,b'$, tubes $c$, and bolts $d\,d'$, passing through the same, and braces or stay-plates between the upper and lower members and within the flanges, substantially as set forth.

2. The combination, in a beam or sill, of the upper and lower members $a\,b$, having flanged or beaded edges $a'\,b'$, tubes $c$, and bolts $d\,d'$, passing through the same, and brace or stay plates $f\,g$, with beaded or flanged ends in opposite directions, said plates being at an inclination between the opposite edges of the upper and lower members, substantially as set forth.

3. The combination, in beam or sill, of the upper and lower members $a\,b$, having flanged or beaded edges $a'\,b'$ and depressed portions $e$, the tubes $c$, and bolts $d\,d'$, passing through the same, and the brace or stay plates $f\,g$, with flanged or beaded edges and at an inclination between the upper and lower members, substantially as set forth.

Signed by me this 22d day of August, A. D. 1889.

GEO. W. DITHRIDGE.

Witnesses:
GEO. T. PINCKNEY,
WILLIAM G. MOTT.